United States Patent
Swanson et al.

(10) Patent No.: US 12,339,177 B2
(45) Date of Patent: Jun. 24, 2025

(54) METHOD FOR ESTIMATING SURFACE TEMPERATURE

(71) Applicant: GENTHERM INCORPORATED, Novi, MI (US)

(72) Inventors: Jeremy Swanson, Ypsilanti, MI (US); Tyler Myers, Plymouth, MI (US); Chad Westerman, Milford, MI (US); Satya Naren Karthik Mandali, Farmington Hills, MI (US); Ankit Tiwari, Farmington Hills, MI (US)

(73) Assignee: GENTHERM INCORPORATED, Novi, MI (US)

( * ) Notice: Subject to any disclaimer, the term of this patent is extended or adjusted under 35 U.S.C. 154(b) by 0 days.

(21) Appl. No.: 18/842,558

(22) PCT Filed: Mar. 3, 2023

(86) PCT No.: PCT/US2023/014475
§ 371 (c)(1),
(2) Date: Aug. 29, 2024

(87) PCT Pub. No.: WO2023/168060
PCT Pub. Date: Sep. 7, 2023

(65) Prior Publication Data
US 2025/0109993 A1   Apr. 3, 2025

Related U.S. Application Data

(60) Provisional application No. 63/316,762, filed on Mar. 4, 2022.

(51) Int. Cl.
*G01K 7/42* (2006.01)

(52) U.S. Cl.
CPC .......... *G01K 7/42* (2013.01); *G01K 2201/02* (2013.01)

(58) Field of Classification Search
CPC ........ G01K 7/42; G01K 2201/02; G01K 3/04; G01K 3/08; G01K 3/00; B60R 13/0243;
(Continued)

(56) References Cited

U.S. PATENT DOCUMENTS

| 4,431,315 A * | 2/1984 | Utton ..................... G01K 17/00 374/54 |
| 6,727,467 B1 | 4/2004 | Hadzizukic et al. |

(Continued)

FOREIGN PATENT DOCUMENTS

| CN | 104081172 A | 10/2014 |
| CN | 112955723 A | 6/2021 |

(Continued)

OTHER PUBLICATIONS

U.S. Appl. No. 18/842,558, filed Jan. 21, 2025_WO_2019064359_A1_H.pdf,Apr. 4, 2019.*

(Continued)

*Primary Examiner* — Gail Kaplan Verbitsky
(74) *Attorney, Agent, or Firm* — The Dobrusin Law Firm, P.C.

(57) ABSTRACT

The present disclosure related to a method for estimating a surface temperature of a trim layer. The method comprises determining a first heat transfer rate and a second heat transfer rate. The method comprises calculating a rate of change of the surface temperature based on the first and second heat transfer rates, and optionally one or more additional heat transfer rates. The method comprises updating an estimated surface temperature of the trim layer from a prior program cycle based on the rate of change of the surface temperature and the estimated surface temperature of the trim layer from the prior program cycle.

20 Claims, 3 Drawing Sheets

(58) Field of Classification Search
CPC .... B60R 2013/0281; B60R 2013/0287; B60R 2013/0293; B60J 5/00
See application file for complete search history.

(56) References Cited

U.S. PATENT DOCUMENTS

| | | | |
|---|---|---|---|
| 7,178,344 | B2 | 2/2007 | Bell |
| 7,196,288 | B2 | 3/2007 | Weiss et al. |
| 7,205,902 | B2 | 4/2007 | Kiribayashi |
| 7,338,117 | B2 | 3/2008 | Iqbal et al. |
| 7,824,099 | B2 | 11/2010 | He et al. |
| 8,143,554 | B2 | 3/2012 | Lofy |
| 9,002,568 | B2 | 4/2015 | Datta et al. |
| 9,103,573 | B2 | 8/2015 | Goenka et al. |
| 9,121,414 | B2 | 9/2015 | Lofy et al. |
| 9,266,454 | B2 | 2/2016 | Barfuss et al. |
| 9,298,207 | B2 | 3/2016 | Li |
| 9,399,480 | B2 | 7/2016 | Zhang et al. |
| 9,333,888 | B2 | 9/2016 | Helmenstein |
| 9,555,686 | B2 | 1/2017 | Ranalli et al. |
| 9,657,963 | B2 | 5/2017 | Lazanja et al. |
| 9,857,107 | B2 | 1/2018 | Inaba et al. |
| 10,266,031 | B2 | 4/2019 | Steinman et al. |
| 10,583,713 | B2 | 3/2020 | Sagou et al. |
| 2003/0109212 | A1 | 6/2003 | Hayashi et al. |
| 2009/0159256 | A1 | 6/2009 | Isoda et al. |
| 2014/0278201 | A1 | 9/2014 | Shimizu |
| 2016/0257272 | A1 | 9/2016 | Ruthinowski |
| 2017/0129375 | A1 | 5/2017 | Zhang |
| 2017/0182861 | A1 | 6/2017 | Steinman et al. |
| 2018/0136051 | A1 | 5/2018 | Ishii |
| 2018/0195911 | A1 | 7/2018 | Kakade et al. |
| 2018/0345753 | A1 | 12/2018 | Beloe |
| 2019/0101945 | A1 | 4/2019 | Marquette et al. |
| 2019/0291613 | A1 | 9/2019 | Gupta et al. |
| 2019/0366799 | A1 | 12/2019 | Czerwonka et al. |
| 2020/0391572 | A1 | 12/2020 | Tsukagishi et al. |
| 2021/0276463 | A1 | 9/2021 | Wolas et al. |
| 2022/0066067 | A1 | 3/2022 | D'Amelio et al. |

FOREIGN PATENT DOCUMENTS

| | | | | |
|---|---|---|---|---|
| DE | 102019108283 A1 | 10/2020 | | |
| EP | 66434 A * | 12/1982 | ............. | G01K 17/00 |
| FR | 3 088 259 A1 | 5/2020 | | |
| JP | 2005-306196 A | 11/2005 | | |
| JP | 2007-010436 A | 1/2007 | | |
| JP | 2007-078475 A | 3/2007 | | |
| JP | 2009-214675 A | 9/2009 | | |
| JP | 2018-081467 A | 5/2018 | | |
| JP | 2018-135833 A | 8/2018 | | |
| JP | 2022-501599 A | 1/2022 | | |
| KR | 10-2003-0046524 A | 6/2003 | | |
| WO | 2008/115831 A1 | 9/2008 | | |
| WO | 2018/049159 A1 | 3/2018 | | |
| WO | WO-2019064359 A1 * | 4/2019 | ............... | B60J 5/00 |
| WO | 2020094981 A1 | 5/2020 | | |
| WO | 2020/112902 A1 | 6/2020 | | |
| WO | 2021/102449 A1 | 5/2021 | | |
| WO | 2021/102450 A1 | 5/2021 | | |
| WO | 2021/126576 A1 | 6/2021 | | |
| WO | 2021/158860 A1 | 8/2021 | | |
| WO | WO-2023168060 A1 * | 9/2023 | ............... | B60N 2/56 |
| WO | WO-2024163246 A1 * | 8/2024 | | |

OTHER PUBLICATIONS

U.S. Appl. No. 18/842,558, filed Jan. 21, 2025_WO_2023168060_A1_H.pdf,Sep. 7, 2023.*

U.S. Appl. No. 18/842,558, filed Jan. 21, 2025_WO_2024163246_A1_H.pdf,Aug. 8, 2024.*

U.S. Appl. No. 18/842,558, filed Jan. 21, 2025_EP_66434_A_H.pdf,Dec. 8, 1982.*

Huizenga et al., A model of human physiology and comfort for assessing complex thermal environments, Center for Environmental Design Research, University of California, Berkeley, CA 94720-1839 (2021).

International Search Report & Written Opinion, PCT Application No. PCT/US2023/014475 dated Jun. 15, 2023.

Korean Office Action, KR Application No. 10-2024-7029836 dated Oct. 22, 2024.

Japanese Office Action, JP Application No. 2024-551674 dated Feb. 25, 2025.

Chinese Office Action, CN Application No. 202380025143.5 dated Mar. 22, 2025.

* cited by examiner

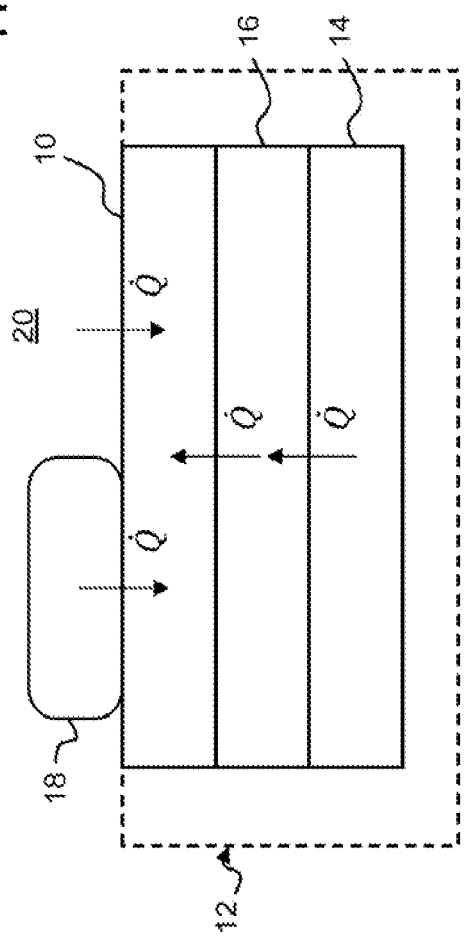

METHOD FOR ESTIMATING SURFACE TEMPERATURE

CROSS-REFERENCE TO RELATED APPLICATIONS

The present application is a national phase of International Application No. PCT/US2023/014475, filed Mar. 3, 2023, which claims priority to U.S. Provisional Patent Application No. 63/316,762, filed Mar. 4, 2022.

FIELD

The present disclosure relates to a method for estimating the temperature of a surface. The estimated surface temperature is utilized for controlling the operation of thermal effectors.

BACKGROUND

Some climatized vehicle systems operate under a set of predetermined discrete setpoints, which are selected by occupants with the actuation of buttons, dials, and the like. One drawback to these systems is the inability to regulate temperature between the setpoints. Another drawback is the continuous changing of the temperature setpoints during operation of the vehicle.

To address these challenges, some climatized vehicle systems employ sensors that monitor parameters such as the temperature of thermal effectors, blower speed, outside temperature, sun radiation, cabin air temperature, humidity, and the number of occupants in the vehicle. The setpoint selected by the occupant is then correlated, via lookup tables, to these parameters and thus the operation of thermal effectors (e.g., the duty cycle of a heater mat) is directed by both the setpoint and the parameters. These systems operate under a finite number of pre-determined scenarios. One drawback to these systems is the large degree of calibration effort undertaken to account for the possible scenarios the vehicle may be exposed to. By way of example, systems are typically calibrated to account for driving in different seasons, geographical climates, weather conditions, and the like. Moreover, the calibrations are performed for each make, model, model year, and trim level of vehicle due to the different effects such parameters have on different vehicle builds, including the quantity and location of thermal effectors.

Typically, sensors and thermal effectors are calibrated individually. Thus, calibrations are undertaken for individual effectors. Due to this individual treatment, thermal effectors typically do not communicate with one another to cooperate in conditioning the vehicle or energy usage. Thus, where a surface is conditioned by multiple thermal effectors, ramp-up to the setpoint temperature typically proceeds slowly in an abundance of caution not to cause discomfort to the occupant.

Similarly, as the calibration accounts for cabin air temperature rather than surface temperature, the operation of thermal effectors is undertaken cautiously to avoid overheating or overcooling occupants, which may cause discomfort. Thus, the time it takes for surfaces to arrive at the selected setpoint temperature is longer relative to other methods.

Some climatized vehicle systems calibrate thermal effectors to specific cabin air temperatures. However, cabin air temperature does not accurately characterize the temperature felt at surfaces by occupants and is subject to constant fluctuations. While providing a sensor proximate to a surface may detect the temperature felt at that surface, several challenges are realized. Repeatable accuracy and precision in the location of these sensors may be needed for thermal effector operation to cooperate with the system's calibration. However, consistent location of these sensors may be difficult in the manufacturing process. Furthermore, the automotive industry is concerned with cost reduction, so additional sensors with their attendant costs are typically not a favorable solution. Sensors provided in or on compressible layers, such as a spacer layer in a seat, may be felt by occupants, negatively impacting comfort. Moreover, compressible layers expose sensors to repeated wear, which can diminish the integrity of the sensor over time.

There is a need for a method to accurately and precisely estimate temperatures felt at surfaces by occupants.

There is a need for a method to utilize existing sensor and/or controller hardware to estimate surface temperatures.

There is a need for a method that provides control of thermal effectors to a dynamic surface temperature, unconstrained by pre-determined setpoints.

There is a need for a method that obviates the need for calibrations to populate lookup tables.

There is a need for a method that provides for collaboration between thermal effectors to condition a common surface and share energy usage.

There is a need for a method that provides for more rapid arrival at setpoints (e.g., temperature) selected by occupants, relative to conventional methods.

SUMMARY

The present disclosure provides for a method that may address at least some of the needs identified above. The method may be for estimating a surface temperature of a trim layer of a vehicle component.

The method may comprise determining a first heat transfer rate to or from the trim layer. The first heat transfer rate may be based on a first temperature applied to the trim layer.

The method may comprise determining a second heat transfer rate to or from the trim layer. The second heat transfer rate may be based on a second temperature applied to the trim layer.

The method may comprise calculating a rate of change of the surface temperature. The rate of change may be based on the first and second heat transfer rates and optionally one or more additional heat transfer rates.

The method may comprise updating an estimated surface temperature of the trim layer from a prior program cycle based on the rate of change of the surface temperature and the estimated surface temperature of the trim layer from the prior program cycle.

The first temperature may be applied by a material layer adjacent to the trim layer. The material layer may be a spacer layer of a vehicle seat. The material layer may be a cushion layer of a steering wheel and/or gear shifter.

The method may comprise obtaining the first temperature and obtaining the estimated surface temperature of the trim layer from the prior program cycle. The first heat transfer rate may be calculated from the difference between the first temperature and the estimated surface temperature of the trim layer from the prior program cycle, a thermal resistance, a surface area through which heat transfer occurs, or any combination thereof. If a prior program cycle value is not available, the estimated surface temperature of the trim layer may be substituted with a temperature sensed by a local sensor.

The method may comprise obtaining an occupancy status of the vehicle component. The occupancy status may influence the thermal resistance utilized in the determination of the first heat transfer rate.

The method may comprise obtaining an occupancy status of the vehicle component. The occupancy status may determine whether the second temperature is applied by an occupant and/or cabin air.

Where the second temperature is applied by the cabin air, the method may comprise obtaining the second temperature, which may be a cabin air temperature, and obtaining the estimated surface temperature of the trim layer from the prior program cycle. The second heat transfer rate may be calculated from the difference between the second temperature and the estimated surface temperature of the trim layer from the prior program cycle, a thermal resistance, a surface area through which the heat transfer occurs, or any combination thereof. If a prior program cycle value is not available, the estimated surface temperature of the trim layer may be substituted with a temperature sensed by a local sensor. The thermal resistance may be that of free convective air.

Where the second temperature is applied by the occupant, the method may comprise obtaining the second temperature, which may be a skin temperature of the occupant, and obtaining the estimated surface temperature of the trim layer from the prior program cycle. The second heat transfer rate may be calculated from the difference between the second temperature and the estimated surface temperature of the trim layer from the prior program cycle, a thermal resistance, a surface area through which the heat transfer occurs, or any combination thereof. If a prior program cycle value is not available, the estimated surface temperature of the trim layer may be substituted with a temperature sensed by a local sensor. The thermal resistance may be the total thermal resistance between the skin of the occupant and the surface, the thermal resistance of clothing, or both.

Where the second temperature is applied by the occupant, the method may comprise determining a third heat transfer rate to or from the trim layer based on a third temperature applied to the trim layer. The second temperature may be applied to one or more first portions of the vehicle component by the occupant and the third temperature may be applied to one or more second portions of the vehicle component by the cabin air.

The method may comprise obtaining the third temperature, which may be the cabin air temperature, and obtaining the estimated surface temperature of the trim layer from the prior program cycle. The third heat transfer rate may be calculated from the difference between the third temperature and the estimated surface temperature of the trim layer from the prior program cycle, a thermal resistance, a surface area through which the heat transfer occurs, or any combination thereof. If a prior program cycle value is not available, the estimated surface temperature of the trim layer may be substituted with a temperature sensed by a local sensor.

The method may comprise obtaining a ratio of occupied surface area to unoccupied surface area; and determining the proportions of the second and third heat transfer rates attributable to the second temperature and attributable to the third temperature.

The skin temperature of the occupant may be assumed to be a fixed value within the normal range of human skin temperature (e.g., 33° C. to 37° C.) and/or dynamically estimated.

The vehicle component may include a steering wheel, a gear shifter, a seat, a headrest, a door panel, an instrument panel, a headliner, a center console, a floor, the like, or any combination thereof.

The material layer may thermally communicate with one or more thermal effectors. The method may comprise determining a heat transfer rate between the one or more thermal effectors and the material layer, based on a temperature of the one or more thermal effectors. Where two or more thermal effectors are employed the one or more additional heat transfer rates may be attributable to the second and any additional thermal effector.

The temperature of the one or more thermal effectors may be inputs provided by sensors. The sensors may include a negative temperature coefficient (NTC) resistor, a resistance temperature detector (RTD), a thermocouple, a semiconductor-type sensor, the like, or any combination thereof.

BRIEF DESCRIPTION OF THE DRAWINGS

FIG. 3 illustrates a vehicle component according to the present disclosure.

DETAILED DESCRIPTION

Introduction

Figure 1:
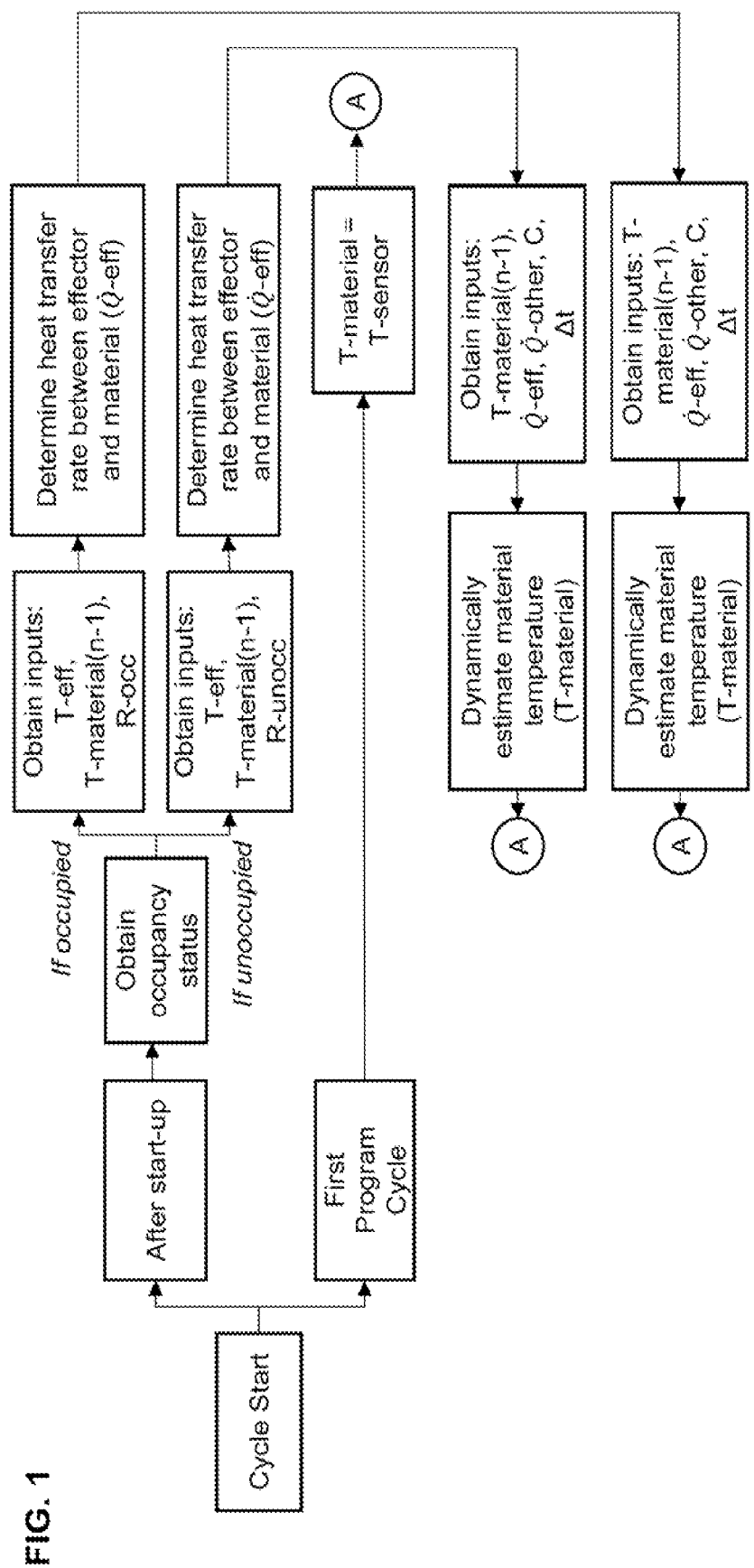
FIG. 1 illustrates a flowchart of the method of the present disclosure.

The present disclosure provides for a method for dynamically estimating the temperature of a surface. The surface may be any surface of a vehicle component. The surface may be located within the cabin of the vehicle. The surface may be on a trim layer. That is, the exposed, visible surfaces of the vehicle commonly contacted by occupants (e.g., seat leather or fabric). The vehicle component may include any component contacted by an occupant. Vehicle components provided herein are presented by way of example but not limitation. The surface may exchange heat with one or more thermal effectors, one or more material layers, an occupant, cabin air, radiative heat sources, or any combination thereof.

The vehicle component may include, but is not limited to, a steering wheel, a gear shifter, a seat, a headrest, a door panel, an instrument panel, a center console, a floor, or any combination thereof. The vehicle component may be any component within the cabin of the vehicle. The vehicle component may be climate controlled. That is, the component may be heated and/or cooled to provide comfort to occupants.

Non-limiting examples of climate-controlled steering wheels are described in U.S. Pat. Nos. 6,727,467 B1 and 9,399,480 B2, incorporated herein by reference for all purposes. A non-limiting example of a climate-controlled gear shifter is described in U.S. Pat. No. 9,298,207 B2, incorporated herein by reference for all purposes. Non-limiting examples of climate controlled seats are described in U.S. Pat. No. 7,338,117 B2 (describing a ventilated seat) and U.S. Pat. No. 7,196,288 B2 (describing a conductively heated seat), incorporated herein by reference for all purposes. A non-limiting example of a climate controlled headrest is described in U.S. Pat. No. 9,333,888 B2, incorporated herein by reference for all purposes.

The temperature of the surfaces may be regulated by one or more thermal effectors ("effectors"). The thermal effectors may be conductive devices. The conductive devices may generate heat that is ultimately conducted to a surface contacted by occupants. The conductive devices may absorb heat from its surroundings that ultimately absorb heat from a surface contacted by occupants.

A non-limiting example of a conductive device is described in U.S. Pat. No. 9,657,963 B2 (describing a heater mat), incorporated herein by reference for all purposes.

Heating and/or cooling may be achieved by the operation of one or more resistance elements, thermoelectric devices, or both. Heating and/or cooling may utilize a fluid medium (e.g., air) that transports heat to and/or from an occupant, vehicle component, or both. A non-limiting example of a resistance element is described in U.S. Pat. No. 9,657,963 B2, incorporated herein by reference for all purposes. A non-limiting example of a thermoelectric device is described in U.S. Pat. No. 9,857,107 B2, incorporated herein by reference for all purposes.

The thermal effectors may be controlled to provide heating or cooling that corresponds with an operation mode and/or a setpoint temperature. The operation mode and/or setpoint temperature may be determined by occupants' actuation of one or more knobs, buttons, dials, toggles, switches, the like, or any combination thereof, which may be otherwise referred to herein as human-machine interfaces. The operation mode and/or setpoint temperature may be determined by an autonomous control system. These systems may account for one or more sensor inputs and regulate the setpoints autonomously via one or more controllers. The operation mode may be ON or OFF. The thermal effectors may be operated by a duty cycle (e.g., pulse width modulation, constant current control, or the like). The duty cycle may operate to ramp-up to achieve, and then maintain the setpoint temperature, at least until the operation mode changes or the setpoint temperature changes by the direction of the occupant and/or an autonomous control system. The duty cycle may operate in accordance with the difference between a dynamically estimated surface temperature and the setpoint temperature.

The dynamic temperature estimation of the present disclosure accounts for the complex system of heat exchanges that occur throughout the vehicle. Outside temperature, humidity, sun radiation, occupants' body temperatures, cabin air temperature, and/or the temperature of vehicle components may contribute to such heat exchanges. Moreover, these parameters may change over time due to the operation of thermal effectors and/or the changing environment within and/or outside the vehicle. Particularly, the present disclosure is concerned with heat exchanges that originate from or ultimately travel to the body of an occupant. In this manner, thermal comfort may be provided to occupants. One exemplary model of heat transfer relative to the human body in transient, non-uniform environments is discussed in Huizenga et al., A model of human physiology and comfort for assessing complex thermal environments, Center for Environmental Design Research, University of California, Berkeley, CA 94720-1839.

The dynamic estimation may be based on principles of physics. One or more heat transfer rates may be calculated, and a surface temperature may be estimated based on the heat transfer rates. The rate of heat transfer between two mediums is generally based on the difference in temperature between the two mediums, the surface area across which the heat transfer is occurring, one or more thermal resistance coefficients, or any combination thereof.

The method of the present disclosure may estimate the temperature of a surface and continuously update the temperature estimation. Thus, the method of the present disclosure may adapt to constantly fluctuating ambient cabin conditions. The method of the present disclosure may adapt in real-time, providing consistent thermal comfort to occupants.

The present disclosure provides for a unique method that may rely on the inputs from the existing sensors that measure the temperature of thermal effectors, sensors that detect the presence of occupants, any other existing sensors in the vehicle, or any combination thereof. The temperature sensor may include a negative temperature coefficient (NTC) resistor, a resistance temperature detector (RTD), a thermocouple, a semiconductor-type sensor, or any combination thereof. Thus, the method of the present disclosure may not require temperature sensors to be located on or proximate to a surface being thermally regulated. A non-limiting example of an occupancy sensor is described in U.S. Pat. No. 7,205,902 B2 (describing a sensor used in the activation of an air bag), incorporated herein by reference for all purposes. Non-limiting examples of occupancy sensors that detect occupants' contact with vehicle components (e.g., steering wheels or gear shifters) are described in U.S. Pat. No. 9,266,454 B2 (describing e.g., capacitance sensors, pressure sensors, etc.), incorporated herein by reference for all purposes.

The dynamic estimation may be based on a relatively small set of pre-determined values compared to conventional methods and systems. These values may include thermal resistances, thermal capacitances, surface areas, ratios of occupied surface area to unoccupied surface area, or any combination thereof. These values are non-limiting and others may be realized by the present disclosure. These values may be stored in a transient or non-transient memory storage medium.

The dynamic estimation may calculate one or more heat transfer rates based on one or more of the foregoing inputs. The heat transfer rates may include those between cabin air and a surface, between an occupant and a surface, between a spacer layer and a surface, between one or more thermal effectors and a material layer, between a first material layer and a second material layer, radiative heat sources and a surface, or any combination thereof. These heat transfer rates are non-limiting and other heat transfer rates may be realized by the present disclosure.

The dynamic estimation may employ one or more look-up tables, transfer functions, equations, or any combination thereof. Preferably, the dynamic estimation may be determined by one or more equations and/or transfer functions characterizing the physics principles of heat transfer between mediums. The equations and/or transfer functions may be provided inputs by sensors, calculations from prior program cycles, pre-determined values (e.g., thermal resistances and surface areas), or any combination thereof. Sensor inputs may be obtained in real-time. Prior program calculations and/or pre-determined values may be obtained from a transient or non-transient memory storage medium.

The method of the present disclosure may bridge the gap between the analytical theory and the actual application. In this regard, some approximations and/or assumptions may be made for the real-life operation of thermal effectors to cooperate with the analytical theory. The concept of lump capacitance may be employed to this end. That is, a three-dimensional solid object undergoing a changing thermal environment can be assumed to be at a uniform bulk temperature thus neglecting temperature gradients throughout the thickness of the object.

Estimation, as referred to herein, may mean the calculation of a parameter understanding that the result of such calculation may not exactly correspond with the actual value (e.g., temperature of a surface). Thus, the result of such calculation may be an estimate of the actual value. The system and method of the present disclosure may provide an estimate that deviates about 10% or less, more preferably 5% or less, or even more preferably 1% or less from the actual value.

Any calculation, dynamic estimation, storage, transmission, and/or obtaining step recited herein may be performed by one or more controllers. The controllers may include one or more dedicated effector controllers, vehicle controllers, or both. Calculations and dynamic estimations may be performed by one controller or distributed between a plurality of controllers. Any non-transient values (e.g., pre-determined values) or inputs may be stored locally on and/or remote from the controllers. Any inputs that are calculated or estimated from prior program cycles may be stored locally on and/or remote from the controllers. Any inputs from one or more prior program cycles may be stored temporarily on and/or remote from the controllers. Any calculated or estimated inputs from one or more prior program cycles may be replaced or updated by calculated or estimated inputs from a current program cycle. The foregoing is applicable to all embodiments.

Any communication or transmission between different controllers, sensors, and/or other devices may be via a local interconnect network (LIN) bus. Communications or transmissions may occur from a sensor to a controller, from a controller to another controller, between one or more thermal effectors and one or more controllers, or any combination thereof. By way of example but not limitation, an occupancy sensor may transmit an occupancy status to a vehicle controller, and then the vehicle controller may transmit the occupancy signal to a dedicated effector controller. The foregoing is applicable to all embodiments.

Vehicle, as referred to herein, may mean any automobile, recreational vehicle, sea vessel, air vessel, the like, or any combination thereof. While the present disclosure discusses the conditioning of a vehicle and surfaces thereof, the teachings herein may be adapted for any space that is conditioned with surfaces that may directly and/or radiatively thermally communicate with individuals. By way of example, the present teachings may be applied to furniture (e.g., chairs and beds), buildings, the like, or any combination thereof.

Dynamically Estimating Surface Temperature

The method may comprise dynamically estimating the surface temperature of a trim layer ($T_{est}$). The surface temperature may be dynamically estimated based on the heat transfer rates of the trim layer to or from one or more surrounding mediums. The surface temperature may be dynamically estimated based on the heat transfer rate between a material layer and the trim layer ($\dot{Q}_{material}$), the heat transfer rate between cabin air and the trim layer ($\dot{Q}_{air}$), the heat transfer rate between an occupant and the trim layer ($\dot{Q}_{occ}$), the heat transfer rate between any number of other sources and the trim layer ($\dot{Q}_{other}$), or any combination thereof.

The change in temperature of the trim layer per unit time ($\dot{T}$) may be determined from the foregoing heat transfer rates.

With a known program cycle time (t) (e.g., 1 second or less, 50 milliseconds or less, 30 milliseconds or less, or even 10 milliseconds or less), a temperature change (ΔT) over the cycle duration may be determined from the change in temperature of the trim layer per unit time, per the following equation.

$$\dot{T} \times t = \Delta T \qquad \text{Eq. A}$$

The temperature change may be added to the initial surface temperature or prior surface temperature ($T_{(n-1)}$) to obtain the estimated surface temperature of the trim layer ($T_{est}$), per the following equation.

$$T_{(n-1)} + \Delta T = T_{est} \qquad \text{Eq. B}$$

The initial or prior surface temperature may be assumed to be equal to the temperature sensed by a local sensor upon start up. These sensors may include those disposed in the cabin, on heating elements, in vent outlets, or otherwise. Any sensors located in the vehicle may provide the temperature at start-up. After start-up, the initial or prior surface temperature may be the estimated surface temperature from a prior program cycle.

The estimated surface temperature of the trim layer may be employed in the operation of one or more effectors. That is, based upon the dynamic estimation of surface temperature, the power cycling and/or ON/OFF command of a thermal effector may be controlled.

The methods for determining the heat transfer rate between a material layer and the trim layer ($\dot{Q}_{material}$), the heat transfer rate between cabin air and the trim layer ($\dot{Q}_{air}$), the heat transfer rate between an occupant and the trim layer ($\dot{Q}_{occ}$), and the heat transfer rate between any number of other sources and the trim layer ($\dot{Q}_{other}$) are provided hereunder.

Heat Transfer Rate Between the Thermal Effector and the Material Layer

Occupants may sit upon and/or contact one or more surfaces of climate-controlled vehicle components. Moreover, one or more surfaces may radiate heat towards occupants. These surfaces may be referred to herein alternatively as trim layers. Typically, thermal effectors are separated from the trim layer by one or more material layers. The material layers may comprise one or more fabrics, films, leathers, foams, meshes, air pockets, the like, or any combination thereof.

When one or more thermal effectors act upon a surface not typically contacted by occupants, or sub-layers thereof, the surface may be adapted to radiate heat to the surface, one or more occupants, or both. The method taught herein may apply similarly to these surfaces.

Typically, one or more spacer layers may separate thermal effectors from trim layers. The spacer layers may function to protect the thermal effectors, provide comfort to occupants, regulate the heat transfer rate from thermal effectors by virtue of the material and thickness of the spacer layers, or any combination thereof.

As provided hereinbefore, the dynamic estimation of surface temperature may be at least partially based on the heat transfer rate between a material layer and the trim layer, where the material layer is disposed adjacent to the trim layer. In order to determine this heat transfer rate, the heat transfer rate between one or more thermal effectors and the material layer may be determined.

Although the present disclosure discloses an arrangement of one material layer (e.g., a spacer layer) disposed between thermal effectors and the trim layer, other layer arrangements are contemplated by the present disclosure. By way of example, a film may be disposed between a material layer and trim layer. The present disclosure contemplates determining heat transfer rates between the layers disclosed herein and any other layers that may be included in vehicle components. Understanding that the heat transfers disclosed herein are between two adjacent and/or contacting layers, the same principles may be applied to any number of material layers disposed between thermal effectors and the trim layer. That is, the heat transfer rate between two material layers may be determined based on the temperatures of the material layers, the surface area through which heat transfers, one or more thermal resistances, or any combination thereof. Any dynamic estimation of either material layer temperature may be performed in a similar manner to, e.g., the dynamic estimation of surface temperature described herein.

Moreover, the present disclosure contemplates a thermal effector disposed in direct contact with a trim layer. In this arrangement, the heat transfer rate between the thermal effector and the trim layer may be calculated in accordance with the present teachings.

The method may comprise calculating the heat transfer rate between a thermal effector (e.g., a heater mat) and a material layer ($\dot{Q}_{eff}$).

The method may comprise obtaining a thermal effector temperature ($T_{eff}$) and a material layer temperature ($T_{material}$). The thermal effector temperature may be provided by an input from one or more sensors (e.g., NTC sensor). The thermal effector temperature may be determined at soak. That is, when a maintained setpoint temperature of a previous cycle is achieved after ramp-up of the temperature. The material layer temperature may be assumed equal to the temperature sensed by a local sensor upon start-up of the vehicle. The material layer temperature may be provided by a dynamic estimation from a prior program cycle, as taught herein, after start-up.

The method may comprise obtaining an occupancy status. The occupancy status may characterize whether an occupant is or is not present in a seat. The occupancy status may characterize whether an occupant is or is not contacting climate-controlled vehicle components (e.g., a steering wheel). The occupancy status may be provided by the vehicle using existing sensors, such as occupancy sensors for the operation of air bags. The occupancy status may be relevant to the thermal resistance, discussed below.

The method of the present disclosure may be performed on a seat that is unoccupied and/or other climate-controlled vehicle components not presently contacted by occupants. The method of the present disclosure may be performed whether or not an ON command is provided to thermal effectors within the seat and/or other climate-controlled vehicle components. In this manner, the initial surface temperature may be known at any time an occupant enters the vehicle and/or contacts a vehicle component. This may be useful for a vehicle that is pre-conditioned (e.g., a vehicle equipped with auto-start) and/or for passengers who enter the vehicle at some point in time after start-up (e.g., picking up children from school).

The method may comprise obtaining a thermal resistance (R). The thermal resistance may be a pre-determined value. The thermal resistance may be unique to different materials, layer thicknesses, and the like. Thus, different makes, models, and model years, with different vehicle component builds, may be associated with unique thermal resistances. The thermal resistance may be obtained from a memory storage medium. The thermal resistance may be obtained from a lookup table. The thermal resistance obtained may reflect whether the seat is occupied or unoccupied. An occupant may compress one or more layers (e.g., a spacer layer) in a seat through which heat is conducted, whereas an unoccupied seat may be uncompressed. Thus, the thermal resistance of an occupied seat ($R_{occ}$) may be different from the thermal resistance of an unoccupied seat ($R_{unocc}$). Regarding climatized vehicle components that are not typically compressed by occupants (e.g., a steering wheel), the thermal resistance utilized in the present method may not change due to occupancy status.

The method may comprise obtaining the surface area through which heat transfer occurs ($A_{surf}$). The surface area may be delineated by the shape of the thermal effectors. The surface area may be a pre-determined value. The surface area may be stored in a memory storage medium.

The method may comprise calculating the heat transfer rate between a thermal effector and a material layer ($\dot{Q}_{eff}$). The heat transfer rate relative to the thermal effector may be calculated from the temperature of the thermal effector ($T_{eff}$), the temperature of the material layer ($T_{material}$), the thermal resistance (R), the surface area through which heat transfer occurs ($A_{surf}$), or any combination thereof. The heat transfer rate ($\dot{Q}_{eff}$) may be determined by the following equation.

$$\dot{Q}_{eff} = \frac{(T_{material} - T_{eff}) \times A_{surf}}{R} \qquad \text{Eq. C}$$

One or more thermal effectors may exchange heat with the same material layer. By way of example, a first thermal effector may exchange heat with the left side of a layer and a second thermal effector may exchange heat with the right side of the same layer. By way of another example, two or more thermal effectors may be stacked one over the other. Two or more, three or more, or even four or more thermal effectors in a stacked arrangement or otherwise acting cooperatively upon the same layer may be contemplated by the present teachings. In the case of multiple effectors, the heat transfer rate of the additional effectors may be determined in accordance with the above method and designated herein as ($\dot{Q}_{other}$).

For arrangements of side-by-side thermal effectors (e.g., left-side and right-side), the dynamic estimation of the material layer temperature, as provided hereunder, may be based on both $\dot{Q}_{eff}$ and $\dot{Q}_{other}$.

For arrangements of stacked thermal effectors, the thermal effectors may be treated as discrete layers. That is, the heat transfer rate from a first thermal effector to a second thermal effector may be calculated in a similar manner, as provided above. Then the heat transfer rate from the second effector to a material layer may be calculated, as provided above. Moreover, the dynamic estimation of the material layer temperature in this scenario may be also based on the heat transfer rate of the second thermal effector and any number of other thermal effectors.

Dynamically Estimating the Material Layer Temperature

The method may comprise dynamically estimating the temperature of the material layer ($T_{material}$). The temperature of the material layer may be employed in order to determine the heat transfer rate between the thermal effector and the material layer, as disclosed hereinbefore. That is, after this value is initially determined it may be utilized by a subsequent program cycle. The temperature of the material layer may be assumed to be the temperature sensed by a local sensor upon start-up of the vehicle. The temperature of the material layer may be employed in order to determine heat transfer rate between the material layer and the trim layer, as disclosed hereunder. The material layer temperature may be provided by a dynamic estimation taught herein.

The temperature of the material layer may be dynamically estimated from the sum of the heat transfer rate between the thermal effector and the material layer ($\dot{Q}_{eff}$), the heat transfer rate between the material layer and the trim layer or another material layer ($\dot{Q}_{material}$), the heat transfer rate between any other medium (e.g., a second thermal effector) and the material layer ($\dot{Q}_{other}$), or any combination thereof, the thermal capacitance of the material layer (C); the time between program cycles (Δt); the prior temperature of the material layer ($T_{material(n-1)}$); or any combination thereof. The prior temperature of the material layer may be provided by a dynamic estimation from a prior program cycle. The prior temperature of the material layer may be assumed equal to the temperature sensed by a local sensor upon start-up of the vehicle. The temperature of the spacer may be determined by the following equation.

$$T_{material} = T_{material(n-1)} + \frac{\sum \dot{Q}}{C} \times \Delta t \qquad \text{Eq. D}$$

The heat transfer rate relative to the thermal effector may be determined as disclosed hereinbefore. The heat transfer rate relative to the trim layer or another layer may be determined as disclosed hereinafter.

The method may comprise obtaining a thermal capacitance. The thermal capacitance may be a pre-determined value. The thermal capacitance may be unique to different materials, layer thicknesses, and the like. Thus, different makes, models, and model years, with different vehicle component builds, may be associated with unique thermal capacitances. The thermal capacitance may be obtained from a memory storage medium.

The method may comprise obtaining a time between program cycles. The program cycle time may be constant or may vary. The program cycle time may be obtained from a memory storage medium. The program cycle time may be determined by a timer.

The method may comprise obtaining a prior temperature of the material layer. The prior temperature of the material layer may be obtained from a prior program cycle. The prior temperature of the material layer may be assumed equal to the temperature sensed by a local sensor upon start-up of the vehicle.

The temperature of the material layer may be employed in the following calculation.

Heat Transfer Rate Between the Material Layer and the Trim Layer, or Between the Material Layer and another Material Layer The method may comprise calculating the heat transfer rate between a material layer and a trim layer or other material layer ($\dot{Q}_{material}$). The heat transfer rate relative to the material layer may be calculated from the temperature of the material layer ($T_{material}$), the temperature of the trim layer ($T_{trim}$), the thermal resistance (R), the surface area through which heat transfer occurs ($A_{surf}$), or any combination thereof. The heat transfer rate relative to the material layer may be determined by the following equation.

$$\dot{Q}_{material} = \frac{(T_{material} - T_{trim}) \times A_{surf}}{R} \qquad \text{Eq. E}$$

Typically, one or more material layers (e.g., spacer layer) may be disposed between the thermal effector and the trim layer. For vehicle components with more than one material layer therebetween, the heat transfer rates may be determined in succession in accordance with the method herein in order to ultimately determine the heat transfer rate between the trim layer and the material layer adjacent to the trim layer.

The method may comprise obtaining the material layer temperature ($T_{material}$) and the trim layer temperature ($T_{trim}$). The temperature of the material layer determined hereinbefore may be employed in the calculation of the heat transfer rate with respect to the trim layer. The temperature of the material layer may be assumed equal to the temperature sensed by a local sensor upon start-up of the vehicle. The temperature of the trim layer may be provided by a dynamic estimation taught herein. The temperature of the trim layer may be assumed equal to the temperature sensed by a local sensor upon start-up of the vehicle.

The method may comprise obtaining an occupancy status. As described hereinbefore, the occupancy status may determine which thermal resistance (R) value to employ in the present method.

The method may comprise obtaining a thermal resistance, as described hereinbefore. The thermal resistance may be obtained from a memory storage medium. The thermal resistance may be obtained from a lookup table. The thermal resistance may be of an occupied seat ($R_{occ}$) or an unoccupied seat ($R_{unocc}$). Regarding climatized vehicle components that are not typically compressed by occupants (e.g., a steering wheel), the thermal resistance utilized in the present method may not change due to occupancy status.

Heat Transfer Rate Between the Cabin Air and the Trim Layer

The method may comprise calculating the heat transfer rate between the cabin air and the trim layer ($\dot{Q}_{cab}$).

The method may comprise obtaining an occupancy status, as described hereinbefore. If the seat is unoccupied, the heat transfer rate between the cabin air and the trim layer may be calculated. If the seat is occupied, the heat transfer rate between the cabin air and the trim layer, and/or the heat transfer rate between the occupant's skin and the trim layer (described hereinafter) may be calculated. Both the heat transfer rates with respect to the cabin air and the occupant may be determined due to different portions of the climate-controlled vehicle component thermally communicating with each. By way of example, while an occupant is seated the areas between an occupant's legs and the area around the peripheral edges of the seat may thermally communicate with the cabin air.

The heat transfer rate relative to the cabin air may be based on the temperature of the cabin ($T_{cab}$), the temperature of the trim layer ($T_{trim}$), the thermal resistance of free convective air ($R_{air}$), the surface area through which heat transfer occurs ($A_{surf}$), or any combination thereof. The heat transfer rate relative to cabin air may be determined by the following equation.

$$\dot{Q}_{cab} = \frac{(T_{cab} - T_{trim}) \times A_{surf}}{R_{air}} \qquad \text{Eq. F}$$

The method may comprise obtaining a cabin air temperature ($T_{cab}$) and a trim layer temperature ($T_{trim}$). The cabin air temperature may be obtained from one or more sensors, an estimation provided by another vehicle system, or both. The trim layer temperature may be obtained from the dynamic estimation taught herein after start-up of the vehicle. Prior to start-up, the trim layer temperature may be assumed equal to the temperature sensed by a local sensor.

The method may comprise obtaining a thermal resistance (R). The thermal resistance may be a pre-determined value. The thermal resistance may be obtained from a lookup table. The thermal resistance may be obtained from a memory storage medium. The thermal resistance may be that of convective free air ($R_{air}$).

The method may comprise obtaining a surface area ($A_{surf}$). The surface area may be the area in which heat transfer occurs. The surface area may be delineated by the area of the vehicle component that may not be contacted by an occupant (i.e., free to thermally communicate with cabin air). The surface area may be a pre-determined value. The surface area may be obtained from a memory storage medium.

Heat Transfer Rate Between the Occupant's Skin and the Trim Layer

The method may comprise calculating the heat transfer rate between the occupant's skin and the trim layer ($\dot{Q}_{skin}$).

The method may comprise obtaining an occupancy status. If the seat is unoccupied, the heat transfer rate between the cabin air and the trim layer may be calculated. If the seat is occupied, the heat transfer rate between the cabin air and the trim layer, and/or the heat transfer rate between the occupant's skin and the trim layer (described hereinafter) may be calculated. Both the heat transfer rates with respect to the cabin air and the occupant may be determined due to different portions of the climate-controlled vehicle component thermally communicating with each, as described hereinbefore. The present disclosure contemplates that the entire surface area of the surface may be contacted by an occupant.

Vehicle components that are contacted by occupants may exchange heat with an occupant and/or cabin air. That is, one or more first portions of the vehicle component may be contacted by and/or thermally communicate with an occupant's body while one or more second portions of the vehicle component may be exposed to and/or thermally communicate with cabin air. Thus, both the heat transfer rate with respect to the occupant's skin ($\dot{Q}_{skin}$) and the heat transfer rate with respect to cabin air ($\dot{Q}_{cab}$), described hereinbefore, may be considered to determine the heat transfer rate of an occupied seat ($\dot{Q}_{occ}$).

The method may comprise obtaining a ratio of occupied surface area to unoccupied surface area (z). The ratio may be a pre-determined value. The ratio may be obtained from a memory storage medium.

The heat transfer rate may be determined by the following equations.

$$\dot{Q}_{skin} = \frac{T_{skin} - T_{trim}}{R_{clo} + R_{skin}} \quad \text{Eq. G}$$

$$\dot{Q}_{occ} = (\dot{Q}_{skin} \times z) + [\dot{Q}_{cab} \times (1-z)] \quad \text{Eq. H}$$

The method may comprise obtaining an occupant's skin temperature ($T_{skin}$) and a trim layer temperature ($T_{trim}$). The skin temperature may be provided by a dynamic estimation taught hereinafter. The skin temperature may be set to a fixed value (e.g., a value within the normal human skin temperature range of 33° C. to 37° C.). The skin temperature may be modelled as a function of trim layer temperature, cabin air temperature, thermal effector operation, or any combination thereof. The trim layer temperature may be provided by a dynamic estimation, taught hereinbefore, after start-up of the vehicle. The trim layer temperature may be assumed equal to the temperature sensed by a local sensor upon start-up of the vehicle.

The method may comprise obtaining a thermal resistance. The thermal resistance may be a pre-determined value. The thermal resistance may be obtained from a memory storage medium. The thermal resistance may be obtained from a lookup table. The thermal resistance may be the total thermal resistance between the skin of an occupant and the surface ($R_{skin}$), including clothing ($R_{clo}$), if present. The thermal resistance may depend on geographic region, season, the body part being conditioned, or any combination thereof. The geographic region may inform assumptions of clothing worn by occupants. In regions where the climate is temperate, heavier clothing (e.g., jackets) may be worn during colder months and lighter clothing (e.g., t-shirts) may be worn during warmer months. In regions where the climate is tropical, lighter clothing may be worn year-round. Moreover, the clothing worn may depend on the body part being conditioned. By way of example, pants worn in colder months may have a thermal resistance that is approximately comparable (e.g., 10% deviation or less) to shorts worn in warmer months. On the other hand, where the torso is being conditioned, jackets worn in colder months may have a greater thermal resistance than shirts worn in warmer months.

Dynamically Estimating Skin Temperature

The occupant's skin temperature may be determined by a dynamic estimation. The dynamic estimation may account for the heat transfer between the occupant and the trim layer, the heat transfer between the occupant and the cabin air, the heat transfer between the occupant and radiative heat sources (e.g., the sun), the heat transfer between the occupant and any other sources, or any combination thereof. Other heat transfers to and/or from the occupant may be realized by the present disclosure.

The skin temperature may be determined by the following equation.

$$T_{skin} = T_{skin(n-1)} + \frac{\sum \dot{Q}}{C_{skin}} \times \Delta t \quad \text{Eq. I}$$

The dynamic estimation may factor in the thermal capacitance of skin ($C_{skin}$).

The dynamic estimation may be based on the temperature of the occupant's skin ($T_{skin}$). Prior to start-up, the skin temperature may be assumed (e.g., a value within the normal human skin temperature range of 33° C. to 37° C.). After start-up, the dynamic estimation of skin temperature from a prior program cycle may be employed for a current program cycle. The skin temperature may be obtained from one or more sensors.

The skin temperature may be determined for specific body parts. The body part considered in the dynamic estimation may be located proximate to the thermal effector being regulated. By way of example, the temperature of an occupant's torso may be determined for the operation of a thermal effector (e.g., a heater mat) located in a seat back.

Moreover, the location of the body part within one or more strata of the cabin may be considered in the present method. The cabin environment may be stratified, between the floor and the roof of the vehicle, due to thermal effectors located in each strata, occupants' body parts located in each strata, thermally influenced air density, or both. Thus, the heat transfer rate between the cabin air and the occupant's skin may account for cabin air temperature of one or more strata. This may be relevant to the dynamic estimation of skin temperature, discussed above.

The illustrations are meant to be exemplary of the present teachings but not limiting. That is, the order in which the method may be performed is not intended to be limited to the order in which flowcharts are illustrated. The method may be performed in any order that is practicable, as will be appreciated by the present disclosure.

Figure 2:
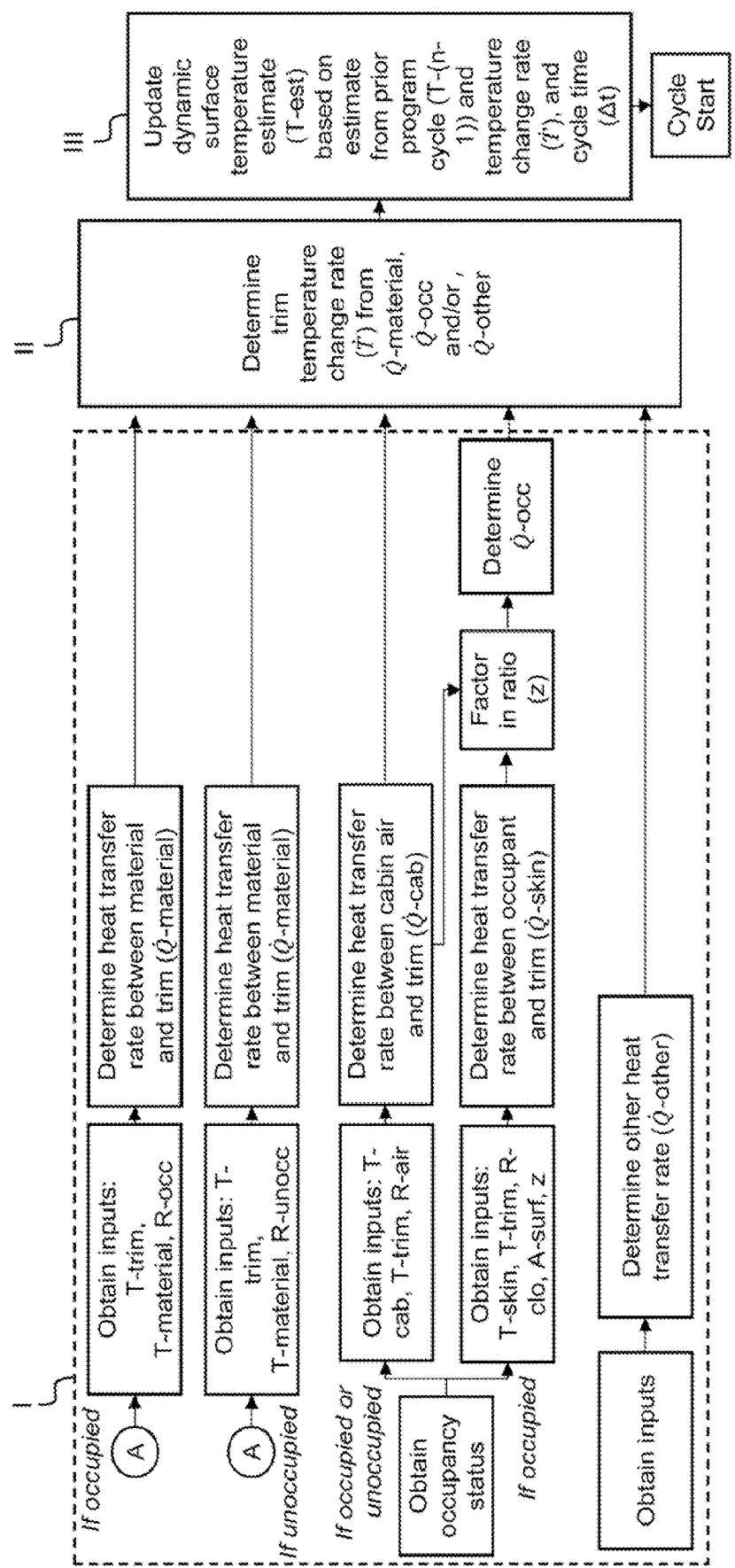
FIG. 2 illustrates a flowchart of the method of the present disclosure.

FIG. 1 illustrates a flowchart of the method of the present disclosure. The dynamic surface temperature estimation, ultimately determined as illustrated in FIG. 2 (referring to box III), is based on the thermal communication between the trim layer and its immediate surroundings. The material layer disposed directly below the trim layer thermally communicates with the trim layer. In order to determine the heat transfer rate therebetween, the temperature of the material layer is determined.

Upon the start of a cycle, one of two conditions may be present. First, the program cycle may occur sometime after start-up. Thus, inputs from prior program cycles, in this case the material layer temperature, may be utilized. Second, the program cycle may occur upon start-up. Thus, inputs from prior program cycles, in this case the material layer temperature, are not available. Assumptions may be made about these inputs. Upon start-up, the spacer temperature may be assumed to be equal to the temperature sensed by any local sensors. These sensors may include those disposed in the cabin, on heating elements, in vent outlets or otherwise. Any sensors located in the vehicle may provide the temperature at start-up.

The method may account for the occupancy status of a vehicle component. This is relevant at least to compressible layers within a seat due to thermal resistance being a function of thickness through which heat is conducted. The occupancy status determines whether to utilize an occupied thermal resistance or an unoccupied thermal resistance. These values may be different due to the compression of layers imposed by occupants. For vehicle components that are generally not influenced by compression (e.g., a steering wheel), the thermal resistance may not be influenced by occupancy status. The occupancy status may also determine whether occupant body heat is utilized as a source of heat transfer to or from the surface.

The heat transfer rate from the thermal effector to the material layer may be determined based on the foregoing inputs. The temperature of the material layer is then determined based on the foregoing inputs, the thermal capacitance of the material layer, as well as any other heat transfer rates with respect to the material layer in the system. By way of example, a second thermal effector may thermally communicate with the material layer.

The temperature of the material layer calculated in this step may be updated in a memory storage medium to be used for a subsequent effector heat transfer rate determination.

Where one or more other layers are disposed between the thermal effector and the material layer, the same method may be repeated, with the requisite inputs, to determine the heat transfer rates therebetween and ultimately determine the temperature of the layer immediately adjacent to the trim layer. Ultimately, the system elements that thermally communicate with the trim layer determine the temperature of the trim layer.

The temperature of the material layer may be utilized as an input (A) for the method illustrated in FIG. 2.

FIG. 2 illustrates a flowchart of the method of the present disclosure. The dynamic surface temperature estimate (referring to box III) is based on the estimate from a prior program cycle, the temperature change rate influenced by heat transfer rates with respect to the trim layer, and the program cycle time.

The dynamic surface temperature estimate from the prior cycle is generally known after start-up. Upon start-up, the surface temperature of the trim layer may be assumed to be equal to the cabin air temperature. The program cycle time can be a fixed value stored in a memory storage medium or determined by a timer.

The temperature change rate is determined (referring to box II) based on the heat transfer rates with respect to the trim layer. Generally, this includes the heat transfer rate between the material layer (e.g., spacer layer) and the trim layer, the heat transfer rate between the cabin air and/or the occupant and trim layer, and any other heat transfer rate in the system. These heat transfer rates (referring to box I) are determined as follows.

The heat transfer rate between the material layer and the trim layer is based on the trim layer temperature, the material layer temperature, and the thermal resistance. The trim layer temperature may be obtained from a prior program cycle or assumed equal to the temperature sensed by any local sensors, as described above. The spacer layer temperature may be obtained as illustrated in FIG. 1 and provided as input (A). The thermal resistance may be selected based on whether or not the seat is occupied.

The method may comprise determining the heat transfer rate between the occupant and the trim layer and/or the cabin air and the trim layer. While a seat may be occupied, one or more first portions of the seat may thermally communicate with the occupant while one or more second portions of the seat may thermally communicate with the cabin air. By way of example, the areas between an occupant's legs and the area around the peripheral edges of the seat may thermally communicate with the cabin air. Thus, with respect to the heat transfer rate of an occupied seat, both the heat transfer rate between the occupant and the trim layer, and the heat transfer rate between the cabin air and the trim layer are considered. The ratio of occupied surface area to unoccupied surface area may determine the proportion of the occupied seat heat transfer rate attributable to the occupant and attributable to the cabin air. The present disclosure contemplates the entire surface area of a surface being in contact with an occupant.

The heat transfer rate between the cabin air and the trim layer is based on the cabin air temperature, the trim layer temperature, and the thermal resistance of convective free air. The cabin air temperature may be obtained from one or more sensors. The trim layer temperature may be assumed to be equal to the temperature sensed by any local sensors upon start-up and after start-up the trim layer temperature may be obtained from the prior program cycle.

The heat transfer rate between the occupant and the trim layer is based on the occupant's skin temperature, the trim layer temperature, and the thermal resistance of clothing. The occupant's skin temperature may be determined by a dynamic estimation disclosed herein. The trim layer temperature may be assumed equal to the temperature sensed by any local sensors upon start-up and after start-up the trim layer temperature may be obtained from the prior program cycle.

If the seat is occupied, then both the heat transfer rate between the cabin air and the trim layer, and the heat transfer rate between the occupant and the trim layer are determined.

The heat transfer rate of the occupied seat is determined accounting for the ratio of occupied surface area to unoccupied surface area.

Given a known program cycle time, the dynamic estimation of surface temperature may be determined based on the change in temperature and the dynamic surface temperature estimate from the prior program cycle. After the dynamic estimation, the cycle restarts with the method illustrated in FIG. 1.

FIG. 3 illustrates a thermally regulated surface 10. The surface 10 is of a trim layer in a vehicle seat 12, although any surface within the cabin of a vehicle may be considered in the method of the present disclosure. The surface 10 is thermally regulated by a thermal effector 14 (e.g., resistance heater mat). Heat generated by the thermal effector 14 is ultimately conducted to the surface 10. As illustrated, a material layer 16 (e.g., spacer layer) is disposed between the thermal effector 14 and the surface 10. The present teachings contemplate more than one material layer 16 disposed therebetween, as well as no material layer 16 disposed therebetween.

Control of the thermal effector 14 is ultimately determined by the heat transfer rate relative to the surface 10 required to achieve a setpoint temperature. Heat transfer rates are indicated by labelled arrows. The setpoint temperature can be directed by an occupant and/or an autonomous control system. Since the surface 10 is subject to a plurality of different heat transfer rates relative to different elements in the system, the thermal effector 14 may function cooperatively or in counteraction to those different heat transfer rates. By way of example, where a surface 10 is to be heated, heat transfer from the thermal effector 14 to the surface 10 may function cooperatively with heat transfer from an occupant 18 to the surface 10. By way of another example, where a surface 10 is to be heated, heat transfer from the thermal effector 14 to the surface 10 may function to counteract heat transfer from the surface 10 to a cold cabin environment 20 (cold relative to the temperature of the surface 10).

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

The method may comprise one or more of the steps recited herein. Some of the steps may be duplicated, removed or eliminated, rearranged relative to other steps, combined into one or more steps, separated into two or more steps, or a combination thereof.

The flow charts described herein do not imply a fixed order to the steps, and embodiments of the present invention may be practiced in any order that is practicable, unless otherwise specified herein.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

What is claimed is:

1. A method for estimating a surface temperature of a trim layer of a vehicle component, the method comprising:

determining a first heat transfer rate to or from the trim layer based on a first temperature applied to the trim layer;

determining a second heat transfer rate to or from the trim layer based on a second temperature applied to the trim layer;

calculating a rate of change of the surface temperature based on the first and second heat transfer rates and optionally one or more additional heat transfer rates; and updating an estimated surface temperature of the trim layer from a prior program cycle based on the rate of change of the surface temperature and the estimated surface temperature of the trim layer from the prior program cycle.

2. The method according to claim 1, wherein the first temperature is applied by a material layer adjacent to the trim layer; and wherein the material layer is a spacer layer of a vehicle seat, or a cushion layer of steering wheel and/or gear shifter.

3. The method according to claim 2, wherein the method comprises:

obtaining the first temperature, and obtaining the estimated surface temperature of the trim layer from the prior program cycle;

wherein the first heat transfer rate is calculated from a difference between the first temperature and the estimated surface temperature of the trim layer from the prior program cycle, a thermal resistance, a surface area through which heat transfer occurs, or any combination thereof, and wherein if a prior program cycle value is not available, the estimated surface temperature of the trim layer is substituted with a temperature sensed by a local sensor.

4. The method according to claim 3, wherein the method comprises:

obtaining an occupancy status of the vehicle component;

wherein the occupancy status influences the thermal resistance utilized in the determination of the first heat transfer rate.

5. The method according to claim 4, wherein the method comprises:

obtaining the occupancy status of the vehicle component;

wherein the occupancy status determines whether the second temperature is applied by an occupant and/or cabin air.

6. The method according to claim 5, wherein where the second temperature is applied by the cabin air, the method comprises:

obtaining the second temperature, which is a cabin air temperature, and obtaining the estimated surface temperature of the trim layer from the prior program cycle;

wherein the second heat transfer rate is calculated from the difference between the second temperature and the estimated surface temperature of the trim layer from the prior program cycle, a thermal resistance, a surface area through which the heat transfer occurs, or any combination thereof.

7. The method according to claim 6, wherein if a prior program cycle value is not available, the estimated surface temperature of the trim layer is substituted with the temperature sensed by the local sensor.

8. The method according to claim 7, wherein the thermal resistance is that of free convective air.

9. The method according to claim 5, wherein where the second temperature is applied by the occupant, the method comprises:

obtaining the second temperature, which is a skin temperature of the occupant, and obtaining the estimated surface temperature of the trim layer from the prior program cycle;

wherein the second heat transfer rate is calculated from a difference between the second temperature and the estimated surface temperature of the trim layer from the prior program cycle, a thermal resistance, a surface area through which the heat transfer occurs, or any combination thereof.

10. The method according to claim 9, wherein if a prior program cycle value is not available, the estimated surface temperature of the trim layer is substituted with the temperature sensed by the local sensor.

11. The method according to claim 10, wherein the thermal resistance is a total thermal resistance between skin of the occupant and the surface, and clothing, if present.

12. The method according to claim 11, wherein where the second temperature is applied by the occupant, the method comprises:

determining a third heat transfer rate to or from the trim layer based on a third temperature applied to the trim layer; and wherein the second temperature is applied to one or more first portions of the vehicle component by the occupant and the third temperature is applied to one or more second portions of the vehicle component by the cabin air.

13. The method according to a claim 12, wherein the method optionally comprises:

obtaining the third temperature, which is the cabin air temperature, and obtaining the estimated surface temperature of the trim layer from the prior program cycle;

wherein the third heat transfer rate is calculated from a difference between the third temperature and the estimated surface temperature of the trim layer from the prior program cycle, a thermal resistance, a surface area through which the heat transfer occurs, or any combination thereof.

14. The method according to claim 13, wherein if a prior program cycle value is not available, the estimated surface temperature of the trim layer is substituted with the temperature sensed by the local sensor.

15. The method according to claim 14, wherein the method comprises:

obtaining a ratio of occupied surface area to unoccupied surface area; and determining the proportions of the second and third heat transfer rates attributable to the second temperature and attributable to the third temperature.

16. The method according to claim 15, wherein the skin temperature of the occupant is assumed to be a fixed value within the normal range of human skin temperature and/or dynamically estimated.

17. The method according to claim 5, wherein the vehicle component includes a steering wheel, a gear shifter, a seat, a headrest, a door panel, an instrument panel, a headliner, a center console, a floor, or any combination thereof.

18. The method according to claim 17, wherein the material layer thermally communicates with one or more thermal effectors; and wherein the method comprises determining a heat transfer rate between the one or more thermal effectors and the material layer, based on a temperature of the one or more thermal effectors.

19. The method according to claim 18, wherein where two or more thermal effectors are employed the one or more additional heat transfer rates are attributable to the second and any additional thermal effector.

20. The method according to claim 5, wherein the temperature of the one or more thermal effectors are inputs provided by sensors;

wherein the sensors include a negative temperature coefficient (NTC) resistor, a resistance temperature detector (RTD), a thermocouple, a semiconductor-type sensor, or any combination thereof.

* * * * *

UNITED STATES PATENT AND TRADEMARK OFFICE
CERTIFICATE OF CORRECTION

| | | |
|---|---|---|
| PATENT NO. | : 12,339,177 B2 | Page 1 of 1 |
| APPLICATION NO. | : 18/842558 | |
| DATED | : June 24, 2025 | |
| INVENTOR(S) | : Jeremy Swanson et al. | |

It is certified that error appears in the above-identified patent and that said Letters Patent is hereby corrected as shown below:

In the Claims

Column 19, Line 57, delete "the difference" and insert --a difference--

Signed and Sealed this
Second Day of September, 2025

Coke Morgan Stewart
*Acting Director of the United States Patent and Trademark Office*